US008588520B2

(12) United States Patent (10) Patent No.: US 8,588,520 B2
Kudoh et al. (45) Date of Patent: Nov. 19, 2013

(54) CHARACTER RECOGNITION METHOD, CHARACTER RECOGNITION APPARATUS, AND CHARACTER RECOGNITION PROGRAM

(75) Inventors: Yasuyuki Kudoh, Inagi (JP); Shohei Hasegawa, Inagi (JP); Shinichi Eguchi, Inagi (JP)

(73) Assignee: Fujitsu Frontech Limited, Tokyo (JP)

( * ) Notice: Subject to any disclaimer, the term of this patent is extended or adjusted under 35 U.S.C. 154(b) by 0 days.

(21) Appl. No.: 13/472,065

(22) Filed: May 15, 2012

(65) Prior Publication Data

US 2012/0308127 A1 Dec. 6, 2012

Related U.S. Application Data

(63) Continuation of application No. PCT/JP2009/070886, filed on Dec. 15, 2009.

(51) Int. Cl.
 *G06K 9/00* (2006.01)
(52) U.S. Cl.
 USPC ......................................... 382/165
(58) Field of Classification Search
 USPC ......................................... 382/165
 See application file for complete search history.

(56) References Cited

U.S. PATENT DOCUMENTS

| | | | |
|---|---|---|---|
| 4,910,787 A * | 3/1990 | Umeda et al. | 382/194 |
| 4,998,626 A | 3/1991 | Ota | |
| 5,181,255 A * | 1/1993 | Bloomberg | 382/176 |
| 7,072,514 B1 * | 7/2006 | Thouin | 382/187 |

FOREIGN PATENT DOCUMENTS

| | | |
|---|---|---|
| EP | 0 298 769 A2 | 1/1989 |
| JP | 64-014682 A | 1/1989 |
| JP | 2000-181993 A | 6/2000 |
| JP | 2000-331122 A | 11/2000 |
| JP | 2006-092345 A | 4/2006 |
| JP | 2008-033604 A | 2/2008 |
| JP | 2009-053826 A | 3/2009 |

OTHER PUBLICATIONS

International Search Report of PCT/JP2009/070886 for mailing date Jan. 19, 2010.

\* cited by examiner

*Primary Examiner* — Samir Ahmed
*Assistant Examiner* — Totam Le
(74) *Attorney, Agent, or Firm* — Westerman, Hattori, Daniels & Adrian, LLP

(57) ABSTRACT

A gradation distribution of an image character is analyzed, the character color of the image character is analyzed, a gradation ratio between a turning point of a character stroke and the character stroke other than the turning point is analyzed, contrast at an edge of the character stroke is analyzed, the vertical size and center position of the image character are analyzed, the character size of the image character and pitch are analyzed, the first to sixth scores that quantify the respective analysis results are aggregated to discriminate whether the image character is handwritten or printed, and the recognition target item is checked to determine whether it includes both handwritten and printed characters. This makes it possible to enhance accuracy of handwritten-printed character discrimination, which leads to reducing a processing time for character recognition and enhancing accuracy of the character recognition.

12 Claims, 21 Drawing Sheets

| | |
|---|---|
| \multicolumn{2}{c}{MONEY TRANSFER FORM} |
| DATE | 平成 21 年 11 月 30 日 |
| SENDER | 富士 太郎 |
| RECEIVER | フンテロック株式会社 |
| AMOUNT | 1.000.000 |

FIG. 3

| SCORE | WEIGHT (%) |
|---|---|
| 1st SCORE | 30 |
| 2nd SCORE | 10 |
| 3rd SCORE | 10 |
| 4th SCORE | 10 |
| 5th SCORE | 30 |
| 6th SCORE | 10 |

AGGREGATE SCORE= 1st SCORE×0.3 + 2nd SCORE×0.1
+ 3rd SCORE×0.1 + 4th SCORE×0.1
+ 5th SCORE×0.3 + 6th SCORE×0.1

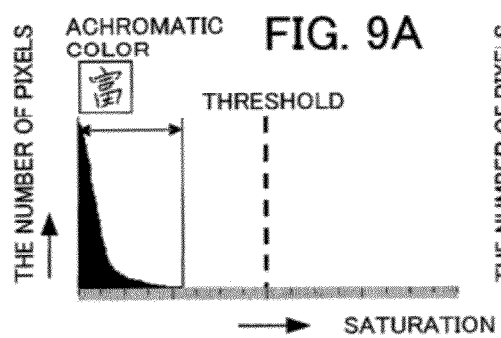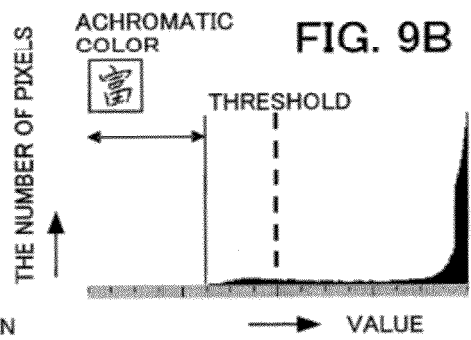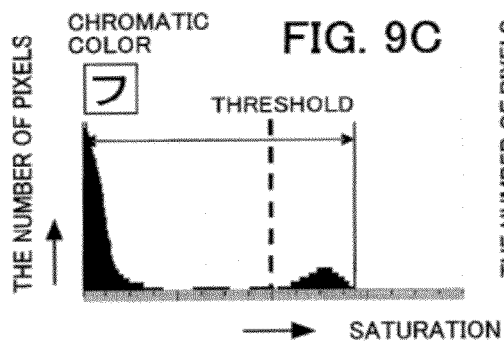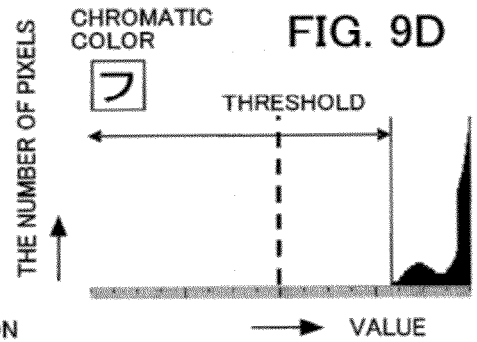

FIG. 15A

|  | 1 | 2 | 3 | 4 |
|---|---|---|---|---|
| CHARACTER CODE | 富 | 士 | 太 | 郎 |
| CENTER COORDINATE OF CHARACTER FRAME | 31 | 64 | 43 | 36 |
| WIDTH OF CHARACTER FRAME | 56 | 54 | 59 | 64 |
| VERTICAL SIZE OF CHARACTER | 74 | 46 | 65 | 75 |

FIG. 15B

1st GROUP, 2nd GROUP, 3rd GROUP

|  | AVERAGE VERTICAL SIZE | AVERAGE CENTER COORDINATE | VERTICAL-SIZE RATIO |
|---|---|---|---|
| 1st GROUP | 74.5 | 33.5 | — |
| 2nd GROUP | 40 | 64 | 61 % |
| 3rd GROUP | 65 | 43 | 87 % |

| CHARACTER CODE | 富 | 士 | 太 | 郎 |
|---|---|---|---|---|
| DIFFERENCE BETWEEN M AND CENTER COORDINATE | 9.2 | 23.8 | 2.8 | 4.2 |
| SCORE | −30 | −50 | −20 | −20 |

(EXAMPLE SCORES IN THE CASE OF THRESHOLD OF 2)

| | 1 | 2 | 3 | 4 | 5 | 6 | 7 | 8 | 9 | 10 |
|---|---|---|---|---|---|---|---|---|---|---|
| CHARACTER CODE | フ | ン | テ | ロ | ッ | ク | 株 | 式 | 会 | 社 |
| CENTER COORDINATE OF CHARACTER FRAME | 88 | 88 | 88 | 88 | 96 | 87 | 86 | 86 | 87 | 88 |
| WIDTH OF CHARACTER FRAME | 28 | 30 | 32 | 26 | 25 | 27 | 36 | 34 | 35 | 37 |
| VERTICAL SIZE OF CHARACTER | 29 | 29 | 29 | 27 | 20 | 29 | 36 | 35 | 36 | 36 |

FIG. 16B

1st GROUP: フンテロク
2nd GROUP: ッ
3rd GROUP: 株式会社

| | AVERAGE VERTICAL SIZE | AVERAGE CENTER COORDINATE | VERTICAL-SIZE RATIO |
|---|---|---|---|
| 1st GROUP | 28.6 | 87.8 | 80 % |
| 2nd GROUP | 20 | 96 | 56 % |
| 3rd GROUP | 35.8 | 86.8 | – |

| CHARACTER CODE | フ | ン | テ | ロ | ク | 株 | 式 | 会 | 社 |
|---|---|---|---|---|---|---|---|---|---|
| DIFFERENCE BETWEEN M AND CENTER COORDINATE | 0.6 | 0.6 | 0.6 | 0.6 | 0.4 | 1.4 | 1.4 | 0.4 | 0.6 |
| SCORE | 40 | 40 | 40 | 40 | 40 | 20 | 20 | 40 | 40 |

(EXAMPLE SCORES IN THE CASE OF THRESHOLD OF 2)

平成 2/ 年 // 月 30 日
| | 平 | 成 | 2 | 1 | 年 | 1 | 1 | 月 | 3 | 0 | 日 | |
|---|---|---|---|---|---|---|---|---|---|---|---|---|
| 1st SCORE | 45 | 44 | -32 | -30 | 46 | -32 | -38 | 44 | -34 | -30 | 47 | |
| 2nd SCORE | 43 | 40 | -50 | -50 | 41 | -50 | -50 | 43 | -50 | -50 | 46 | |
| 3rd SCORE | 41 | 47 | -44 | -34 | 46 | -33 | -37 | 41 | -32 | -31 | 41 | |
| 4th SCORE | 41 | 46 | -44 | -35 | 45 | -34 | -37 | 45 | -38 | -28 | 43 | |
| 5th SCORE | 44 | 45 | -45 | -37 | 43 | -35 | -31 | 46 | -31 | -30 | 44 | |
| 6th SCORE | 50 | -50 | -50 | -50 | 50 | -50 | -50 | 50 | -50 | -50 | 50 | |
| AGGREGATE SCORE | 44.2 | 35 | -41.9 | -37 | 44.9 | -36.8 | -38 | 44.9 | -36.5 | -33.9 | 45.3 | AVERAGE |
| (SCORE) - (AVERAGE) | 45.1 | 35.9 | -41.0 | -36.1 | 45.8 | -35.9 | -37.1 | 45.8 | -35.6 | -33.0 | 46.2 | -0.9 |
| JUDGEMENT | NO | NO | NO | NO | NO | NO | NO | NO | NO | NO | NO | |
| | 平 | 成 | 2 | 1 | 年 | 1 | 1 | 月 | 3 | 0 | 日 | AVERAGE |
|---|---|---|---|---|---|---|---|---|---|---|---|---|
| AGGREGATE SCORE | 44.2 | 35 | | | 44.9 | | | 44.9 | | | 45.3 | 42.86 |
| (SCORE) - (AVERAGE) | 1.3 | -7.9 | | | 2.0 | | | 2.0 | | | 2.4 | |
| JUDGEMENT | YES | YES | | | YES | | | YES | | | YES | |
FIG. 20

CHARACTER RECOGNITION METHOD, CHARACTER RECOGNITION APPARATUS, AND CHARACTER RECOGNITION PROGRAM

CROSS-REFERENCE TO RELATED APPLICATION

This application is a continuation application of International Application PCT/JP2009/070886 filed on Dec. 15, 2009 and designated the U.S., the entire contents of which are incorporated herein by reference.

FIELD

The present invention relates to a character recognition method, a character recognition apparatus, and a character recognition program, and more particularly to a character recognition method, character recognition apparatus, and character recognition program for discriminating between printed characters and handwritten characters on forms that are used by financial institutions.

BACKGROUND

Financial institutions use character recognition apparatuses which recognize characters on forms, in order to implement automatic entry of characters printed and handwritten on the forms. To enhance accuracy of the character recognition, these character recognition apparatuses recognize character strings on the basis of form definition information that is prepared to define subheadings printed on forms and where and in what order data corresponding to the subheadings is written.

A form has pre-printed characters and characters written by a user. The form definition defines whether a character recognition target item is handwritten or printed. When recognizing characters on a form, a character recognition apparatus checks the form definition, and uses a handwritten character recognition engine if the character recognition target item is defined to be handwritten or uses a printed character recognition engine if the character recognition target item is defined to be printed, to thereby recognize the characters.

As described above, in the case of the character recognition using the form definition, it is previously defined whether character recognition target items are handwritten or printed, so as to enhance the accuracy of the recognition by appropriately performing the recognition according to handwriting or printing. However, in order to set the form definition, target forms need to be acquired in advance, and only limited forms are allowed to be collected. Therefore, the character recognition apparatuses are able to handle only the limited forms. In addition, setting the form definition takes many man-hours because each character recognition target item needs to be set whether it is handwritten or printed.

To eliminate this problem, there has been proposed a method of extracting a character string from image data of a document, calculating the center position of each character in height direction, discriminating based on the regularity of the center positions whether the character string is printed or handwritten, and then recognizing the characters on the basis of the discrimination result (see, for example, Japanese Laid-open Patent Publication No. 2000-181993).

The method disclosed in Japanese Laid-open Patent Publication No. 2000-181993 has a drawback that the regularity of center positions may vary if a character string includes characters with voiced sound mark or contracted sound characters. To overcome this problem, there has been known a method of extracting characters except characters with voiced sound mark and contracted sound characters from a character string, and discriminating on the basis of the regularity of the center positions of the extracted characters whether the character string is handwritten or printed (see, for example, Japanese Laid-open Patent Publication No. 2000-331122).

In addition, there has also been known a method of clipping characters, calculating a plurality of feature values regarding the characters, and determining on the basis of the obtained feature values whether the characters are handwritten or printed (see, for example, Japanese Laid-open Patent Publication No. 2006-92345). The features may include density uniformity, variation in pixel value, linearity of character strokes, heights of characters, uniformity of width, and uniformity of line widths of characters.

The existing character recognition methods determine only whether the character string of a character recognition target item is handwritten or printed. Even character recognition methods using form definition may not be able to process character recognition target items that may include both handwritten and printed characters. Therefore, such character recognition methods invoke both printed and handwritten character recognition engines to recognize characters, which takes a long processing time.

SUMMARY

In one aspect of the embodiments, there is provided a character recognition method executed by a computer. The character recognition method includes: specifying a character recognition target item from image data of the form; calculating a position and size of an image character in the specified character recognition target item; calculating a score that quantifies a possibility of handwriting or printing by analyzing the image character on the basis of characteristics of handwritten and printed characters; discriminating on the basis of the score whether the image character is handwritten or printed; calculating an average value of scores of characters of the recognition target item, and checking whether or not the recognition target item includes both handwritten and printed characters; and performing character recognition on each character of the recognition target item with an appropriate character recognition engine for a result of discriminating whether said each character is handwritten or printed and a result of checking whether the recognition target item includes both handwritten and printed characters, wherein: the calculating of the score includes: calculating a first score that quantifies a possibility of handwriting or printing by analyzing a gradation distribution of the image character; calculating a second score that quantifies a possibility of handwriting or printing by analyzing a character color of the image character; calculating a third score that quantifies a possibility of handwriting or printing by analyzing a gradation ratio between a turning point where a character stroke extracted from the image character changes and the character stroke other than the turning point; calculating a fourth score that quantifies a possibility of handwriting or printing by analyzing contrast at an edge of the character stroke, the contrast indicating a degree of change in gray level at a boundary between the character stroke and background; calculating a fifth score that quantifies a possibility of handwriting or printing by analyzing vertical sizes and center positions of the characters on the basis of a position and size of the image character; and calculating a sixth score that quantifies a possibility of handwriting or printing by analyzing character sizes and pitch on the basis of the position and size of the image character; and in discriminating whether the image character is handwritten or printed, the first to sixth scores are aggregated by weighting the first to sixth scores according to respective importance.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 3 illustrates an example form to be recognized;

FIG. 7A illustrates a histogram of gradation values of a handwritten character; and FIG. 7B illustrates a histogram of gradation values of a printed character;

FIGS. 9A to 9D are diagrams for explaining a character color analysis process: FIG. 9A illustrates a saturation histogram of a handwritten character; FIG. 9B illustrates a value histogram of the handwritten character; FIG. 9C illustrates a saturation histogram of a printed character; and FIG. 9D illustrates a value histogram of the printed character;

FIG. 11A illustrates an example turning point of a handwritten character; and FIG. 11B illustrates an example turning point of a printed character;

FIG. 13A illustrates a change in gradation value of a handwritten character; and FIG. 13B illustrates a change in gradation value of a printed character;

FIGS. 15A to 15D are diagrams for explaining example analysis using the character sizes and center positions of handwritten characters: FIG. 15A illustrates a calculation result regarding the circumscribed rectangles of collections of black pixels; FIG. 15B illustrates a calculation result regarding grouping according to the vertical sizes of characters; FIG. 15C illustrates an average coordinate of the center positions of the characters; and FIG. 15D illustrates a result of calculating a difference between the average coordinate of the center positions and the center coordinate of each character;

FIG. 16 is diagrams for explaining example analysis using the character sizes and center positions of printed characters: FIG. 16A illustrates a calculation result regarding the circumscribed rectangles of collections of black pixels; FIG. 16B illustrates a calculation result regarding grouping according to the vertical sizes of characters; FIG. 16C illustrates an average coordinate of the center positions of the characters; and FIG. 16D illustrates a result of calculating a difference between the average coordinate of the center positions and the center coordinate of each character;

FIG. 20 is a diagram for explaining how to process a character recognition target item including both handwritten and printed characters.

DESCRIPTION OF EMBODIMENTS

An embodiment of the present invention will now be described in detail with reference to the drawings. The following describes an example in which a money transfer form used by a financial institute is used as a target form by an apparatus which recognizes printed and handwritten character strings on this money transfer form.

Figure 1:
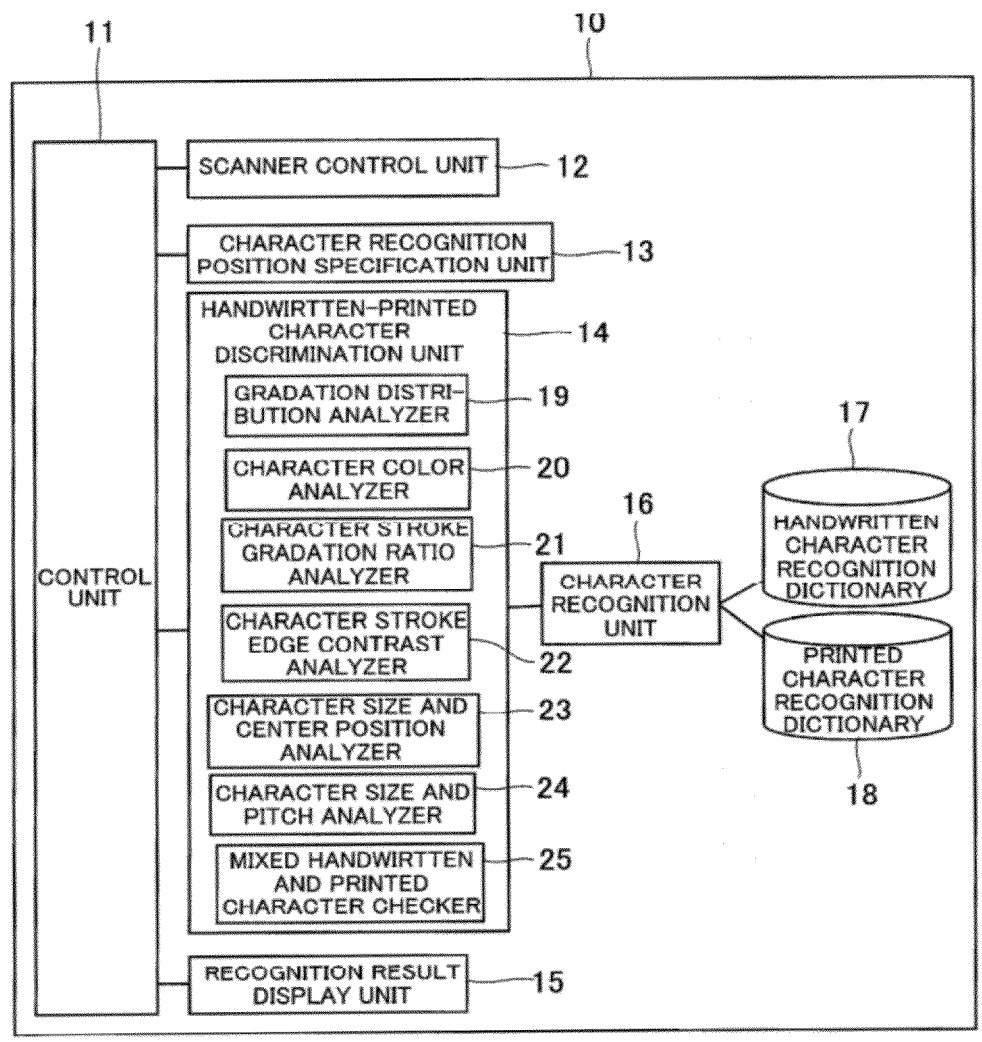
FIG. 1 is a block diagram illustrating a character recognition apparatus according to one embodiment.

FIG. 1 is a block diagram illustrating a character recognition apparatus according to one embodiment.

A character recognition apparatus 10 includes a control unit 11 that entirely controls the apparatus. Connected to this control unit 11 are a scanner control unit 12, a character recognition position specification unit 13, a handwritten-printed character discrimination unit 14, and a recognition result display unit 15. A character recognition unit 16 is connected to the handwritten-printed character discrimination unit 14, and a handwritten character recognition dictionary 17 and printed character recognition dictionary 18 are provided so as to allow the character recognition unit 16 to consult for a character recognition process.

The handwritten-printed character discrimination unit 14 has a function of discriminating whether characters of a recognition target item are handwritten or printed, and the character recognition unit is capable of performing a character recognition process using an appropriate character recognition engine according to the discrimination result. To this end, this handwritten-printed character discrimination unit 14 includes a gradation distribution analyzer 19, a character color analyzer 20, a character stroke gradation ratio analyzer 21, a character stroke edge contrast analyzer 22, a character size and center position analyzer 23, a character size and pitch analyzer 24, and a mixed handwritten and printed character checker 25.

In an analysis, the gradation distribution analyzer 19 utilizes characteristic tendencies for a printed, character with a fixed gray level to exhibit a narrow gray-level distribution and for a handwritten character with varying gray levels to exhibit a wide gray-level distribution. This gradation distribution analyzer calculates a score (first score) that quantifies a possibility of handwriting or printing, on the basis of a result of the analysis.

In an analysis, the character color analyzer 20 utilizes such characteristic tendencies that forms used by banks have characters handwritten, mostly in black or in blue if the characters are written through a carbon paper, and also have characters printed in different colors. This character color analyzer 20 calculates a score (second score) that quantifies a possibility of handwriting or printing, on the basis of a result of the analysis on whether a character is achromatic or chromatic.

In an analysis, the character stroke gradation ratio analyzer 21 utilizes a characteristic tendency for a handwritten character to exhibit a higher gray level at a point (turning point) where a character stroke changes because writing becomes slow at such a turning point. This tendency does not apply to printed characters. This character stroke gradation ratio analyzer 21 analyzes a gradation ratio between a turning point and a character stroke, and calculates a score (third score) that quantifies a possibility of handwriting or printing.

In an analysis, the character stroke edge contrast analyzer 22 utilizes characteristic tendencies for a printed character to exhibit high contrast (a big change in gray level) at an edge between the printed character and background and for a handwritten character to exhibit low contrast at an edge. This character stroke edge contrast analyzer 22 analyzes contrast at an edge, and calculates a score (fourth score) that quantifies a possibility of handwriting or printing.

The character size and center position analyzer analyzes the vertical size and center position of a character. That is to say, printed characters on a form have almost the same vertical size, whereas handwritten characters have different vertical sizes. In addition, the printed characters on the form have centers at fixed positions, whereas the handwritten characters have centers at different positions because, unlike printed characters, characters cannot be written by hand at fixed positions. Utilizing such tendencies in an analysis, the character size and center position analyzer 23 calculates a score (fifth score) that quantifies a possibility of handwriting or printing.

The character size and pitch analyzer 24 has a function of correcting an analysis result obtained by the character size and center position analyzer 23 which determines smaller characters than normal, such as contracted sound characters, to be variations. This character size and pitch analyzer 24 determines that a character recognized as a variation between characters of same type may be a printed character, and calculates a score (sixth score) that quantifies a possibility of handwriting or printing.

The mixed handwritten and printed character checker 25 checks whether or not the character string in a recognition target item includes both handwritten and printed characters. This enables the character recognition unit 16 to use an appropriate character recognition engine for each character in a character recognition process even if both handwritten and printed characters are included in the single recognition target item.

The handwritten-printed character discrimination unit 14 discriminates whether an image character is handwritten or printed, on the basis of an aggregate score calculated by aggregating the first to sixth scores calculated by the analyzers by weighting these scores according to their respective importance and a check result obtained by the mixed handwritten and printed character checker 25.

Figure 2:
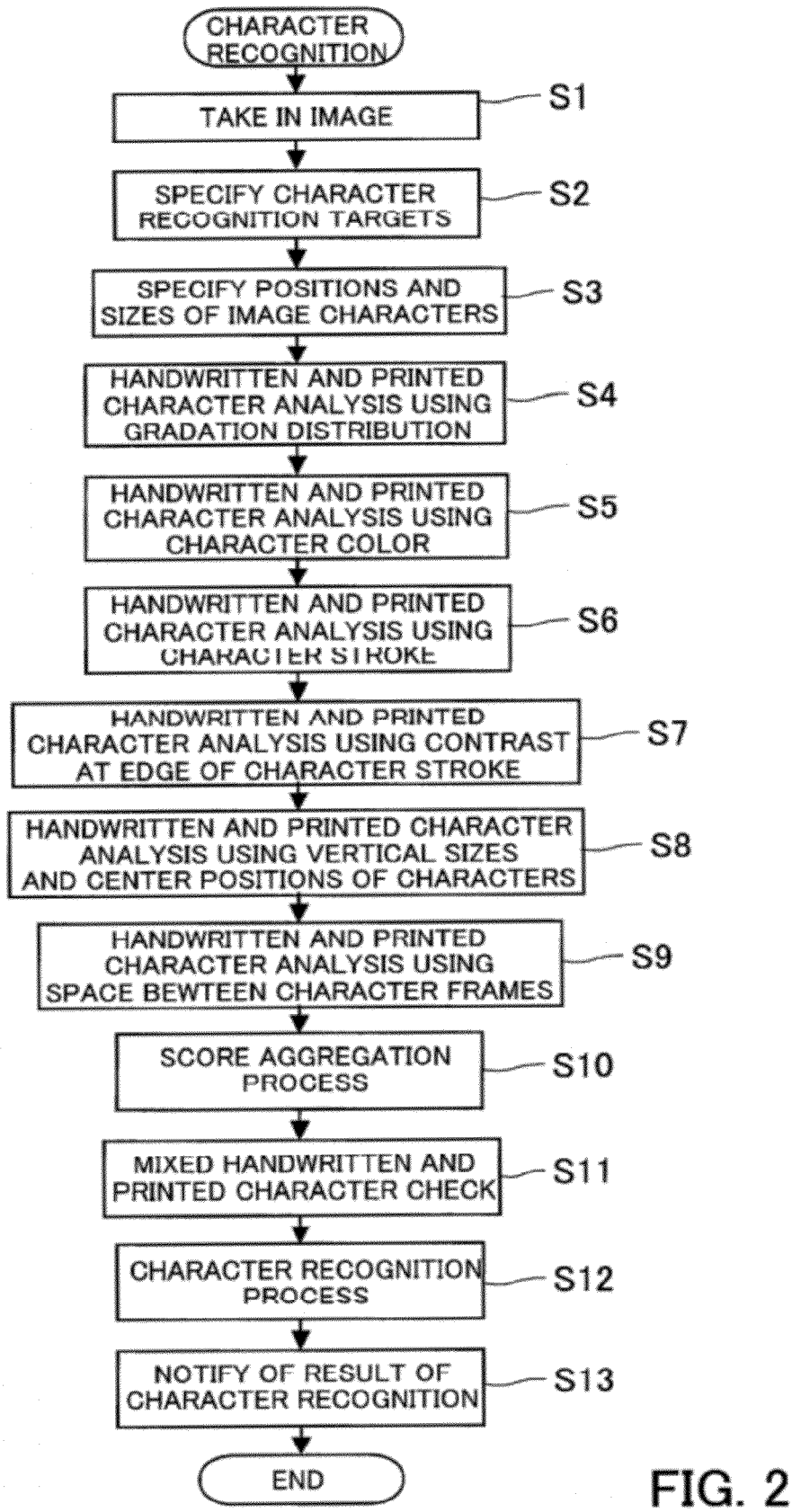
FIG. 2 is a flowchart of an entire character recognition process.
Figure 4:
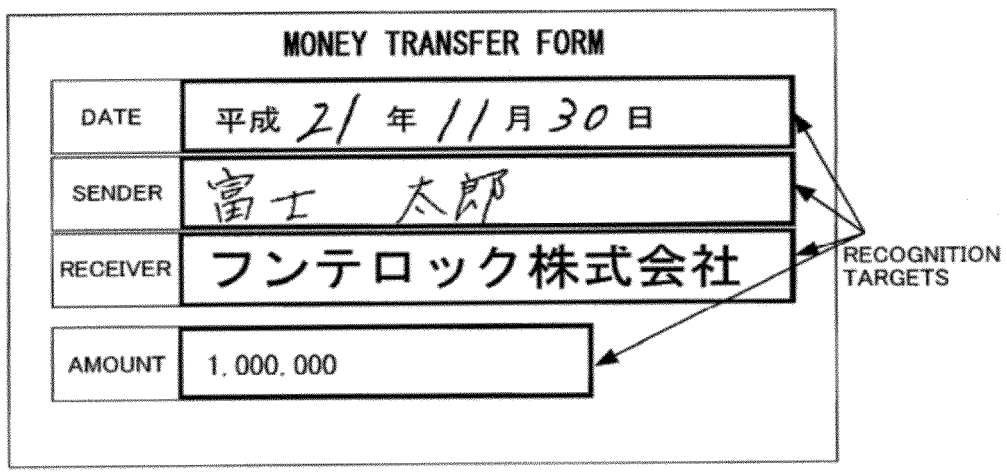
FIG. 4 illustrates a state where areas targeted for character recognition are specified in the image of a form.
Figure 5:
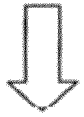
FIG. 5 illustrates example weights to be given to scores in a score aggregation process.

FIG. 2 is a flowchart of an entire character recognition process. FIG. 3 illustrates an example form to be recognized. FIG. 4 illustrates a state where an area targeted for character recognition is specified in the image of a form. FIG. 5 illustrates example weights to be given to scores in a score aggregation process.

The character recognition apparatus 10 takes in the image of a form scanned with a scanner by the scanner control unit 12 (step S1). The form to be scanned may be a money transfer form as illustrated in FIG. 2, for example, and character strings other than a headline are written by handwriting or printing in ruled line boxes.

Then, the control unit 11 of the character recognition apparatus 10 specifies areas targeted for the character recognition in the image of the form (step S2). A recognition target area may be an area in a ruled line box where headline characters do not exist, for example, as illustrated in FIG. 3. Referring to FIG. 3, recognition target areas are indicated by a thick line. The control unit 11 then performs a labeling process of cutting out image characters from the image of a specified recognition target area to specify the positions and sizes of the image characters (step S3), and supplies them to the handwritten-printed character discrimination unit 14.

In the handwritten-printed character discrimination unit 14, first, the gradation distribution analyzer 19 analyzes a distribution of gradation values representing the gray levels of a character, and calculates a first score according to the gradation distribution (step S4). Then, the character color analyzer 20 analyzes the color of the character, and calculates a second score according to the character color (step S5).

Then, the character stroke gradation ratio analyzer 21 analyzes a gradation ratio between a turning point where a character stroke changes and the character stroke, and calculates a third score according to the ratio (step S6). The character stroke edge contrast analyzer 22 analyzes edge contrast representing a degree of change in gray level at an edge of a character stroke, and calculates a fourth score according to the blurring state of the character stroke edge (step S7).

Then, the character size and center position analyzer 23 analyzes the vertical sizes and center positions of the characters, and calculates a fifth score according to a variation in vertical size and center position (step S8). The character size and pitch analyzer 24 compares the recognition target character with each of the characters existing on both sides of the target character in terms of vertical size, and also analyzes a character pitch between the recognition target character and each of the characters existing on both sides of the target character, and calculates a sixth score regarding the vertical size and character pitch under specified conditions (step S9).

The handwritten-printed character discrimination unit 14 aggregates the first to sixth scores calculated as described above to discriminate whether the recognition target character is handwritten or printed (step S10). In this aggregation process, the first to sixth scores are weighted according to their respective importance as illustrated in FIG. 5. Referring to the example of FIG. 5, the first score and fifth score are weighted most in this handwritten-printed character discrimination process. The aggregate score is obtained by calculating a sum of the values obtained by giving the first to sixth scores the respective weights. In this embodiment, the first to sixth scores calculated in the respective analyses are numerical values ranging from −50 to +50 according to possibility of handwriting or printing. More specifically, with a value 0 as a center, a positive aggregate score indicates that a character is a printed character, and a negative aggregate score indicates that a character is a handwritten character.

Then, the mixed handwritten and printed character checker 25 checks the character string in the recognition target item to see whether this string includes both handwritten and printed characters (step S11).

Then, the character recognition unit 16 performs a character recognition process using the handwritten character recognition dictionary 17 or printed character recognition dictionary 18 on the basis of the discrimination result obtained by the handwritten-printed character discrimination unit 14 and the check result obtained by the mixed handwritten and printed character checker 25 (step S12), and supplies the character recognition result to, for example, an apparatus which carries out a money transfer process (step S13).

The following describes each analysis process carried out in the handwritten-printed character discrimination unit 14.

Figure 6:
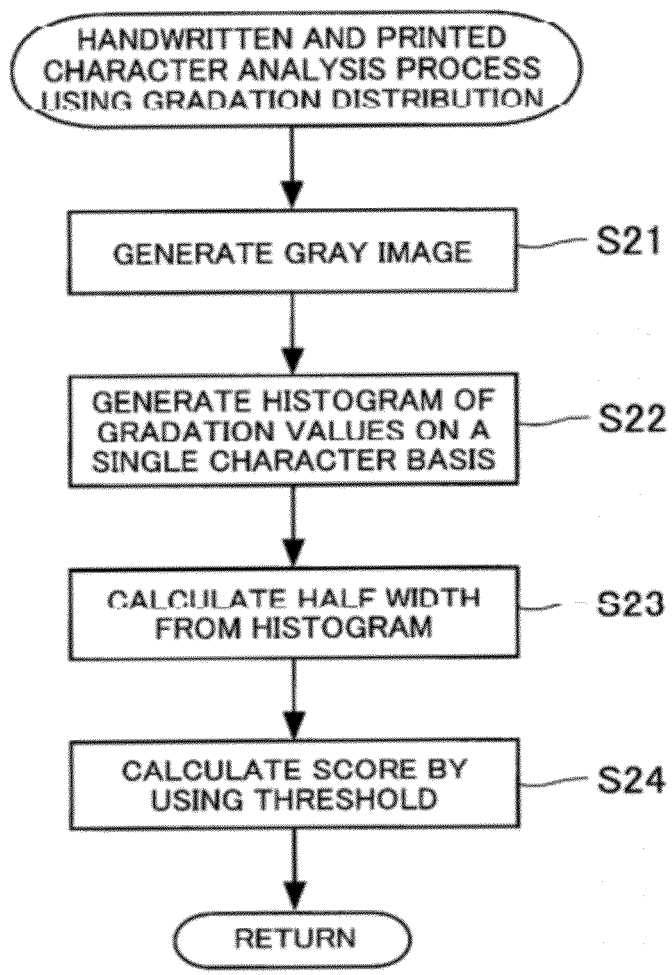
FIG. 6 is a flowchart of a handwritten and printed character analysis process using a gradation distribution.
Figure 7A:
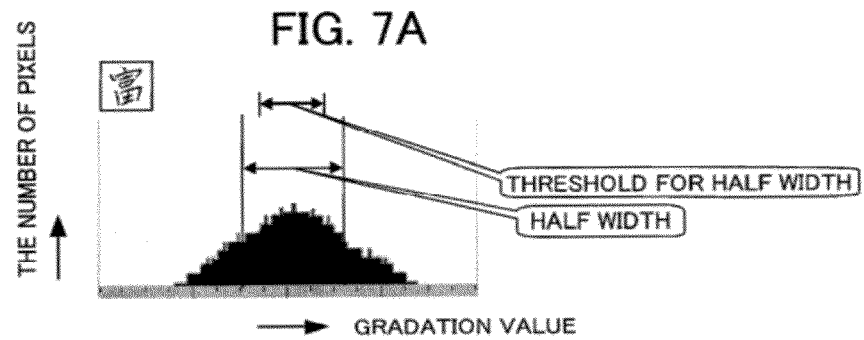
FIGS. 7A and 7B are diagrams for explaining a gradation distribution analysis process.
Figure 7B:
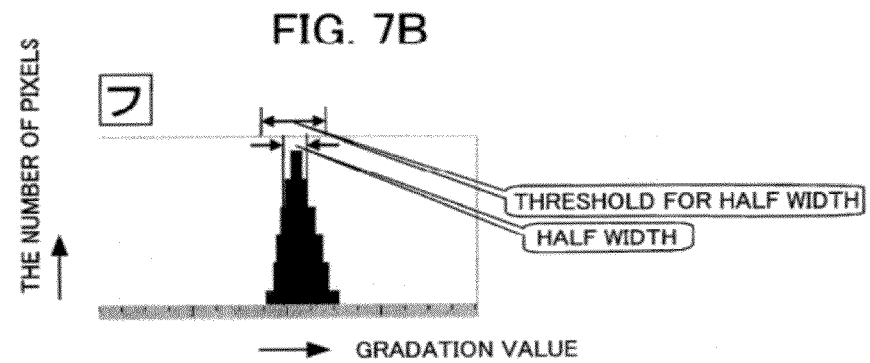

FIG. 6 is a flowchart of a handwritten and printed character analysis process using a gradation distribution. FIGS. 7A and 7B are diagrams for explaining a gradation distribution analysis process: FIG. 7A illustrates a histogram of gradation values of a handwritten character; and FIG. 7B illustrates a histogram of gradation values of a printed character.

The gradation distribution analyzer 19 first generates a gray image based on the image of an image character whose position and size have been specified in a character recognition target item (step S21), and generates a histogram of the number of pixels (gradation values) obtained by scanning, one pixel by one pixel, the pixels of the character obtained by excluding background pixels from the gray image (step S22). Then, the gradation distribution analyzer 19 calculates a half width on the basis of the generated histogram (step S23), and calculates a first score by using a threshold for the half width (step S24). This process is performed on each character in the character recognition target item.

According to the generated histograms illustrated in FIGS. 7A and 7B, in the case of a handwritten character illustrated in FIG. 7A, the character does not have a fixed gray level due to varying writing pressure, which causes a wide range of gradation values and therefore the distribution of the gradation values becomes wide. As a result, the half width of the distribution of the gradation values is wider than the threshold. In this connection, the half width is a width obtained by eliminating background pixels from a histogram, scanning the remaining histogram from a point having the greatest number of pixels, from side to side, and taking a half of the pixels. In the case of this handwritten character, a negative value generated on the basis of a differential value between the half width and the threshold is taken as the first score.

On the other hand, in the case of a printed character illustrated in FIG. 7B, the character has a fixed gray level and there is a little portion with an intermediate gradation value between the character and background, and therefore a distribution of gradation values becomes narrow, and the half width thereof becomes smaller than the threshold. In the case of this printed character, a positive value generated on the basis of a differential value between the half width and the threshold is taken as the first score.

Figure 8:
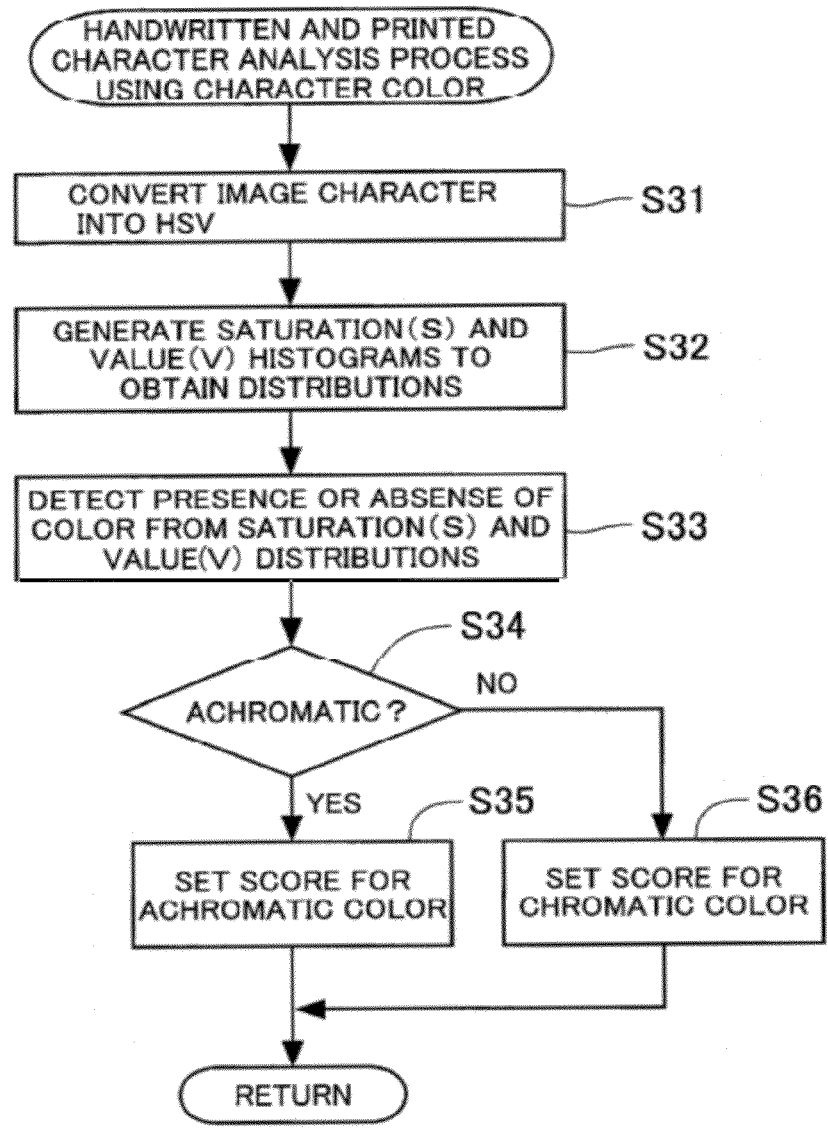
FIG. 8 is a flowchart of a handwritten and printed character analysis process using character color.

FIG. 8 is a flowchart of a handwritten and printed character analysis process using character color. FIGS. 9A to 9D are diagrams for explaining a character color analysis process: FIG. 9A illustrates a saturation histogram of a handwritten character; FIG. 9B illustrates a value histogram of the handwritten character; FIG. 9C illustrates a saturation histogram of a printed character; and FIG. 9D illustrates a value histogram of the printed character.

The character color analyzer 20 first converts the image of an image character whose position and size have been specified in a character recognition target item into an HSV color space comprising Hue (H), Saturation (S), and Value (V) (step S31). Then, the character color analyzer 20 generates Saturation (S) and Value (V) histograms to obtain their distributions (step S32), and detects the presence or absence of color from the Saturation (S) and Value (V) distributions (step S33).

With respect to the saturation distributions illustrated in FIGS. 9A and 9C, a color with a high value is brighter, and saturation is concentrated around zero if bright colors are not used. Similarly, with respect to the value distributions illustrated in FIGS. 9B and 9D, a color with a high value is lighter, and value is distributed up to close to zero if light colors are not used.

A threshold is set for each of the saturation and value distributions. If values of the saturation and value distributions are both smaller than the respective thresholds, a color is determined achromatic. On the contrary, if values of the saturation and value distributions are both greater than the respective thresholds, a color is determined chromatic.

After the character color is calculated at step S33, it is determined whether the character color is achromatic or not (step S34). In the case of an achromatic color, −50 is set as a second score and a hue histogram is not generated (step S35). In the case where the character color is not achromatic, +50 is set as the second score (step S36).

In this connection, if blue is defined as a color for handwriting, a process for identifying the blue color is added. Specifically, in the case where values of the saturation and value distributions are both greater than the respective thresholds, and it is determined at step S34 that a color is not achromatic, a Hue (H) histogram is generated and a used color is determined. The Hue (H) histogram represents a distribution of colors used in an image. Background pixels are excluded from the Hue (H) histogram, and a ratio of pixels existing in a blue area to all pixels in the remaining histogram is calculated. A threshold is set for a ratio of pixels existing in a blue area, and if the ratio exceeds the threshold, a character is determined to be blue. In this case, a difference between the ratio of pixels existing in the blue area and the threshold is obtained, and a value generated on the basis of the difference is set as the second score.

Figure 10:
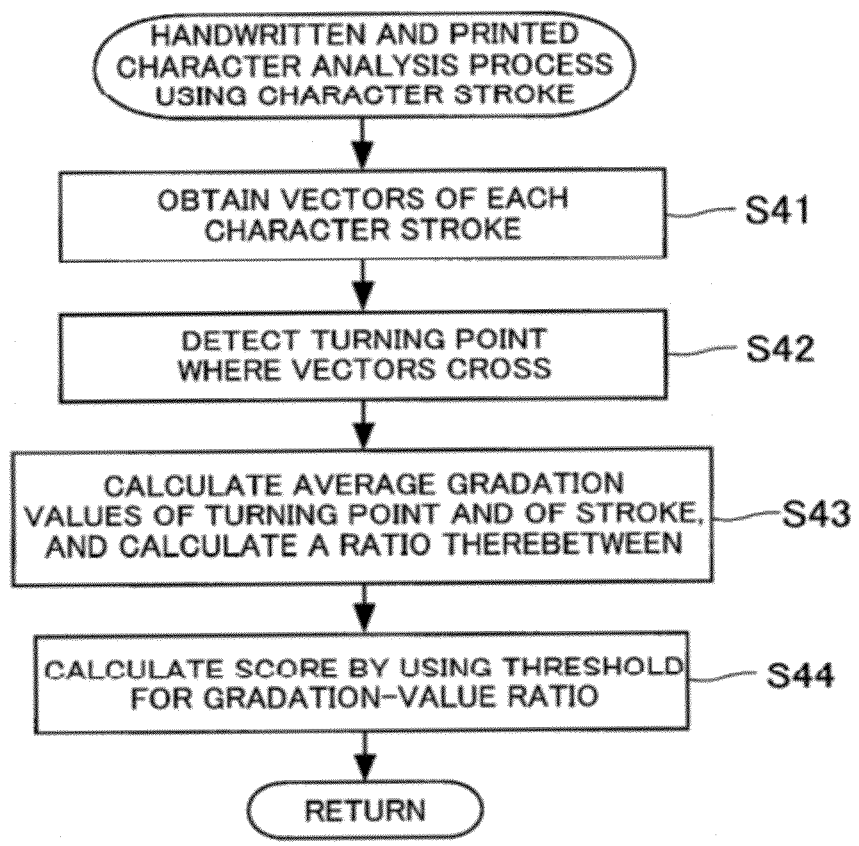
FIG. 10 is a flowchart of a handwritten and printed character analysis process using a character stroke.
Figure 11A:
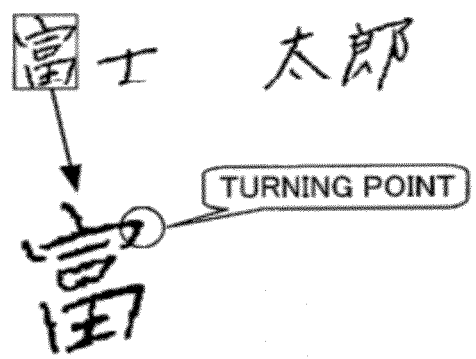
FIGS. 11A and 11B are diagrams for explaining a stroke and a turning point.
Figure 11B:
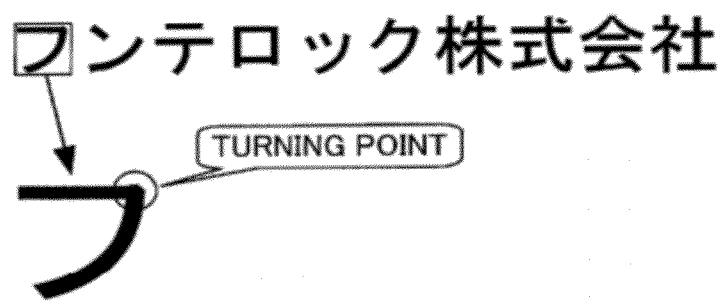

FIG. 10 is a flowchart of a handwritten and printed character analysis process using a character stroke. FIGS. 11A and 11B are diagrams for explaining a stroke and a turning point: FIG. 11A illustrates an example turning point of a handwritten character; and FIG. 11B illustrates an example turning point of a printed character.

The character stroke gradation ratio analyzer 21 first extracts the strokes of a character by searching for black pixels successive in the image of an image character whose position and size have been specified in a character recognition target item, and obtains the vectors of each of the extracted character strokes (step S41). Then, the character stroke gradation ratio analyzer 21 detects a point at which a vector changes, and takes this point as a turning point (step S42). This turning point is a point where vectors of a character stroke cross. In the case of a handwritten character, gradation tends to occur due to writing pressure as illustrated in a circle in FIG. 11A. In the case of a printed character, such gradation may not occur.

Then, the character stroke gradation ratio analyzer 21 calculates an average gradation value of the turning point and an average gradation value of the entire character stroke other than the turning point, and calculates a ratio between the average gradation value of the turning point and the average gradation value of the entire character stroke other than the turning point (step S43). A handwritten character is more likely to exhibit a large ratio between an average gradation value of a turning point and an average gradation value of an entire character stroke other than the turning point, and a printed character is more likely to exhibit a small ratio. Then, a threshold is set for the gradation-value ratio, a difference between the threshold and the gradation-value ratio is calculated, and a value generated on the basis of the difference is set as a third score. In this connection, a negative value is set for a handwritten character, and a positive value is set for a printed character (step S44).

Figure 12:
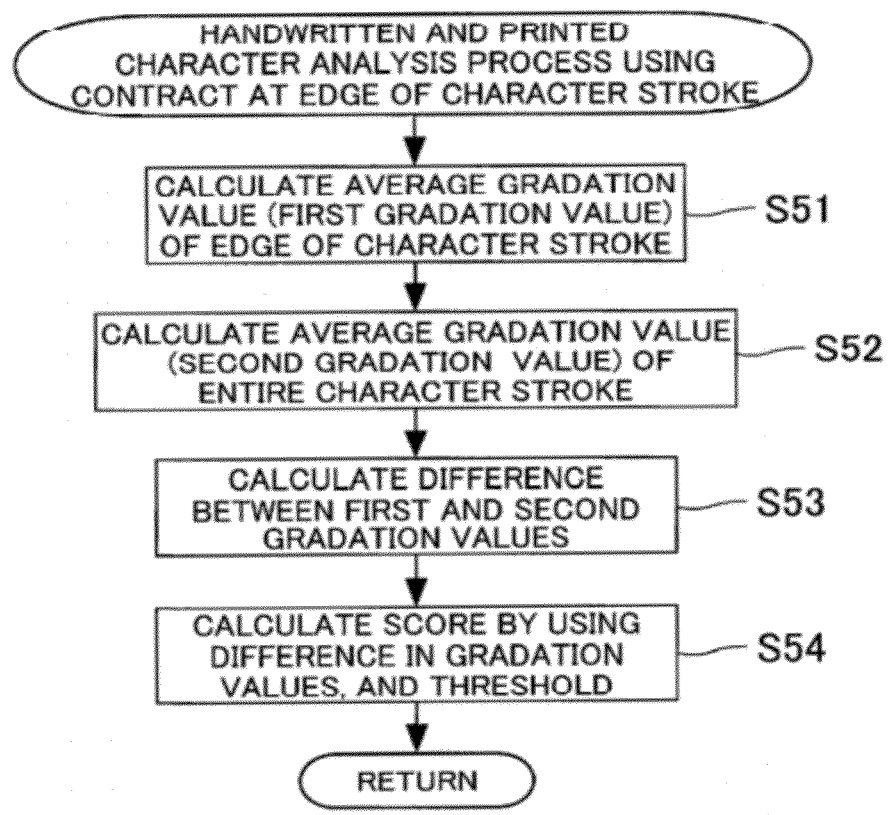
FIG. 12 is a flowchart of a handwritten and printed character analysis process using contrast at an edge of a character stroke.
Figure 13A:
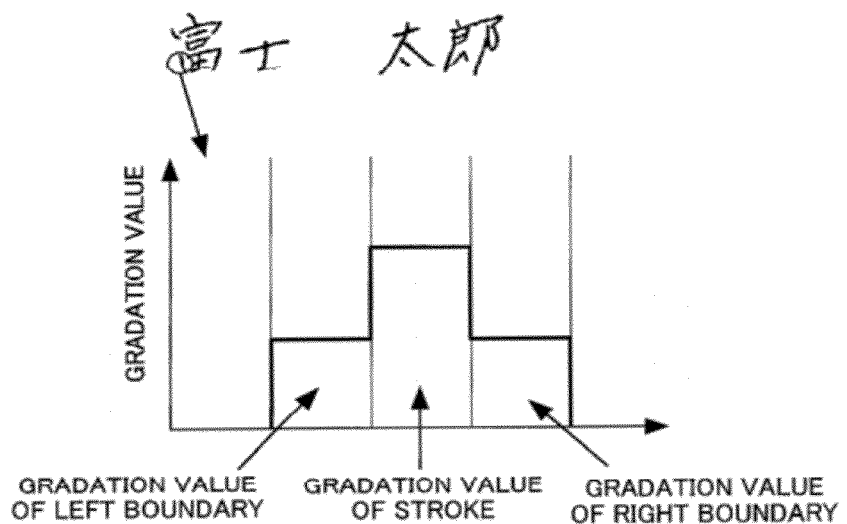
FIGS. 13A and 13B are drawings explaining contrast at an edge of a character stroke.
Figure 13B:
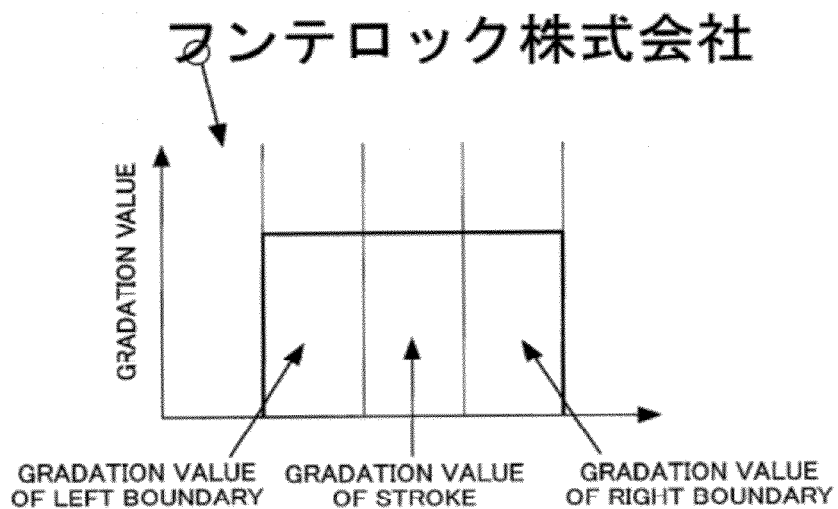

FIG. 12 is a flowchart of a handwritten and printed character analysis process using contrast at an edge of a character stroke. FIGS. 13A and 13B are diagrams for explaining contrast at an edge of a character stroke: FIG. 13A illustrates a change in gradation value of a handwritten character; and FIG. 13B illustrates a change in gradation value of a printed character.

The character stroke edge contrast analyzer 22 utilizes the characteristics that handwritten characters and printed characters exhibit different changes in gray level at an edge along the boundary between a character and background, i.e., different contrast at an edge of a character stroke. The character stroke edge contrast analyzer 22 first divides a character stroke into three, i.e., left, middle, and right, along a vector direction, and calculates an average gradation value (taken as a first gradation value) of the left and right boundaries of the edge (step S51). Then, the character stroke edge contrast analyzer 22 calculates an average gradation value of the entire character stroke (taken as a second gradation value) (step S52), and calculates a difference between the first and second gradation values (step S53). In the case of a handwritten character, as illustrated in FIG. 13A, a difference from the second gradation value becomes large because the first gradation value decreases due to blurs at a character stroke edge. In the case of a printed character, as illustrated in FIG. 13B, a difference between the first and second gradation values is small because the first gradation value decreases little. Then, a threshold is set for the difference between the first and second gradation values, and a score is calculated on the basis of the difference between the first and second gradation values, and the threshold, and as a fourth score, a negative value is set in the case of a handwritten character, or a positive value is set in the case of a printed character (step S54).

In this connection, in this example, it is determined whether a character is handwritten or printed, on the basis of edge contrast between a character stroke edge and a character stroke. Alternatively, this determination may be made on the basis of edge contrast between a character stroke edge and the background around the character stroke edge. In this case, the above steps S52 and S53 are replaced with a step of calculating an average of gradation values in the background around the edge (taken as a third gradation value, and in claims, taken as a second gradation value), and calculating a difference between the first and third gradation values. The difference between the first and third gradation values is small in the case of a handwritten character, and is large in the case of a printed character. Therefore, it is determined on the basis of this difference whether the fourth score is a negative value or positive value.

Figure 14:
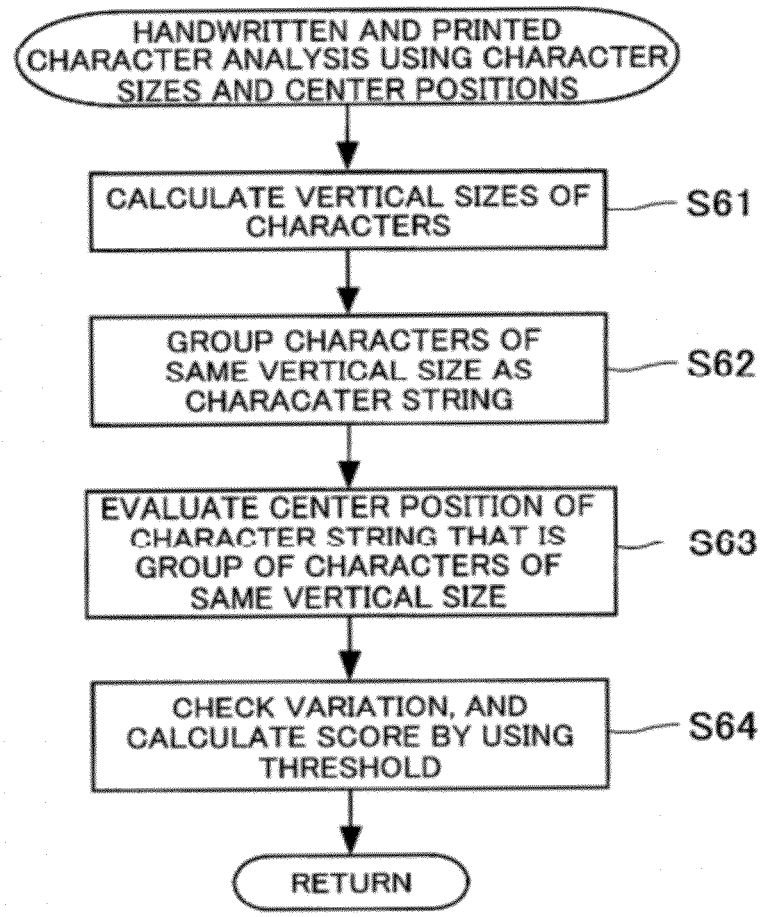
FIG. 14 is a flowchart of a handwritten and printed character analysis process using character sizes and center positions.

FIG. 14 is a flowchart of a handwritten and printed character analysis process using character sizes and center positions. FIGS. 15A to 15D are diagrams for explaining example analysis using the character sizes and center positions of handwritten characters: FIG. 15A illustrates a calculation result regarding the circumscribed rectangles of collections of black pixels; FIG. 15B illustrates a calculation result regarding grouping according to the vertical sizes of characters; FIG. 15C illustrates an average coordinate of the center positions of the characters; and FIG. 15D illustrates a result of calculating a difference between the average coordinate of the center positions and the center coordinate of each character. FIGS. 16A to 16D are diagrams for explaining example analysis according to the character sizes and center positions of printed characters: FIG. 16A illustrates a calculation result regarding the circumscribed rectangles of collections of black pixels; FIG. 16B illustrates a calculation result regarding grouping according to the vertical sizes of characters; FIG. 16C illustrates an average coordinate of the center positions of the characters; and FIG. 16D illustrates a result of calculating a difference between the average coordinate of the center positions and the center coordinate of each character.

The character size and center position analyzer calculates a vertical size of each character in a character recognition target item (step S61), and makes groups of character strings by grouping characters of the same size (step S62). Not only the exact same size but also sizes with small differences are considered as the same size. The calculated vertical size of each character is managed together with data such as an order of the character in the character recognition target item, the center coordinate of the character frame, and the width of the character frame, as illustrated in FIGS. 15A and 16A. To make the groups of character strings, characters in the character recognition target item are grouped according to vertical size, and in the illustrated example, the characters are put into the first to third groups as illustrated in FIGS. 15B and 16B. At this time, with respect to each character string group, an average vertical size, an average center coordinate, and a vertical-size ratio are also calculated. A vertical-size ratio is calculated in such a manner that calculated average vertical sizes are taken as S1, S2, ..., Sn, and the maximum out of S1 to Sn is taken as Smax, and with the vertical size of a character string in question represented as S, a ratio (S/Smax) of the average vertical size S of the character string in question to the maximum average vertical size Smax of the character string is calculated.

Then, the center position of a character string that is a group of characters of the same size is evaluated (step S63). That is, an average center coordinate M is calculated by calculating a product of an average center coordinate and the square of the number of characters with respect to each character string, calculating a sum of the calculated products, and dividing the calculated sum by a sum of the squares of the numbers of characters of the respective character strings. In the example of FIGS. 15A to 15D, the average center coordinate M is calculated as follows.

$$M=(33.5\times 4+64\times 1+43\times 1)/(4+1+1)=40.2 \tag{1}$$

In the example of FIGS. 16A to 16D, the average center coordinate M is calculated as follows.

$$M=(87.8\times 25+86.8\times 16)/(25+16)=87.4 \tag{2}$$

The average center coordinate M and the characters in the character recognition target item have the positional relations, as illustrated in FIGS. 15C and 16C. In this calculation of the average center coordinate M, character strings whose vertical-size ratio is lower than a predetermined ratio are excluded from this analysis using center positions. For example, in the example of FIG. 16B, the character string of the second group has a low vertical-size ratio of 56%, and therefore, this character string is excluded from the equation (2) for calculating the average center coordinate M.

Then, a difference between the average center coordinate M and the center coordinate of each character is calculated to check a variation, and then a fifth score is calculated by using a threshold (step S64). In the case of a large variation, the character is determined to be handwritten. In the case of a small variation, the character is determined to be printed. FIGS. 15D and 16D illustrate examples of variations and scores of the characters in the character recognition target items. This handwritten and printed character analysis process using character sizes and center positions is performed for each character recognition target item, and a score of each character is a score that is obtained within each item.

Figure 17:
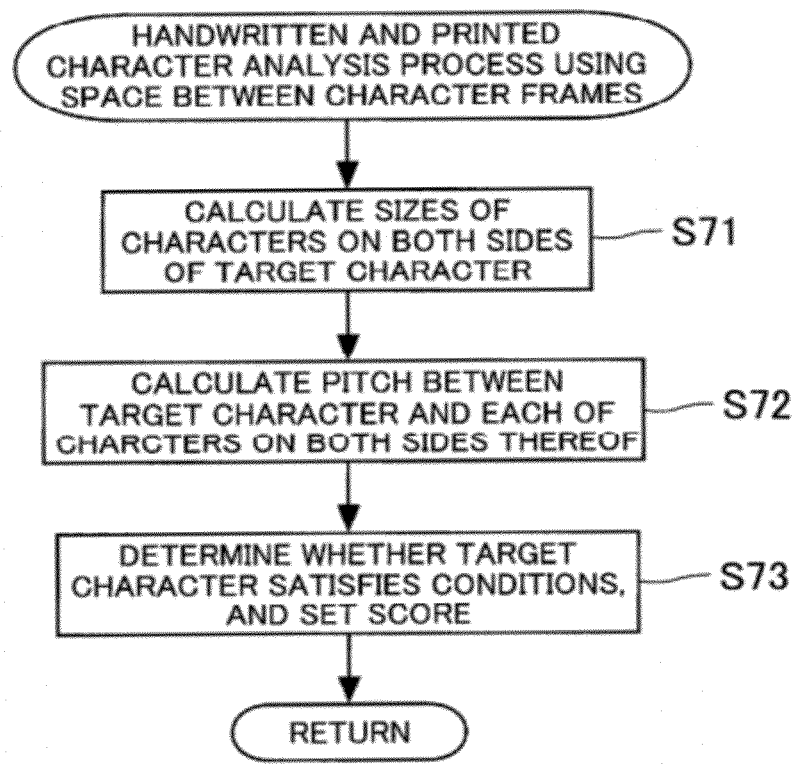
FIG. 17 is a flowchart of a handwritten and printed character analysis process using space between character frames.

FIG. 17 is a flowchart of a handwritten and printed character analysis process using space between character frames.

Figure 18:
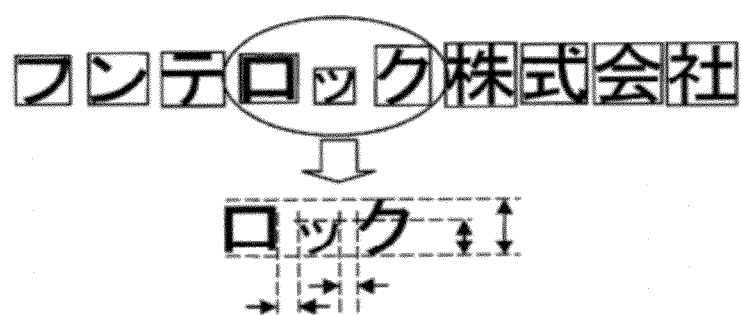
FIG. 18 is a diagram for explaining an example handwritten and printed character analysis using space between character frames.

FIG. 18 is a diagram for explaining an example handwritten and printed character analysis process using space between character frames.

The character size and pitch analyzer 24 calculates the sizes of characters exiting on both sides of a recognition target character (step S71), and calculates a pitch between the recognition target character and each of the characters existing on both sides thereof (step S72). The character size and pitch analyzer 24 determines whether the character satisfies predetermined conditions, and sets a sixth score (step S73). In the analysis using the vertical sizes and center positions of characters, the character size and center position analyzer 23 determines characters smaller than normal, such as contracted sound characters, as variations. On the other hand, the character size and pitch analyzer determines characters satisfying the predetermined conditions as printed characters.

The predetermined conditions are that the vertical size of a character is smaller than that of each of the characters on both sides thereof, and pitches between the character and characters existing on both sides thereof are almost the same. Referring to the example of FIG. 18, the character "ツ" is smaller in height than the characters existing on both sides thereof ("ロ" and "ク"), and the character is located at an expected position away from the characters on the both sides. Therefore, this character is determined to be a printed character. In this way, a contracted sound character between characters of same type is determined to be a printed character if the character satisfies the predetermined conditions.

As the sixth score, +50 is set for a character which satisfies the above predetermined conditions and is determined to be a printed character, and −50 is set for a character which is determined to be a handwritten character otherwise.

The handwritten-printed character discrimination unit 14 discriminates whether a character is handwritten or printed, by aggregating the first to sixth scores obtained as described above. Such comprehensive analysis on printed and handwritten characters based on a combination of the plurality of analysis results realizes higher accuracy of discrimination.

Figure 19:
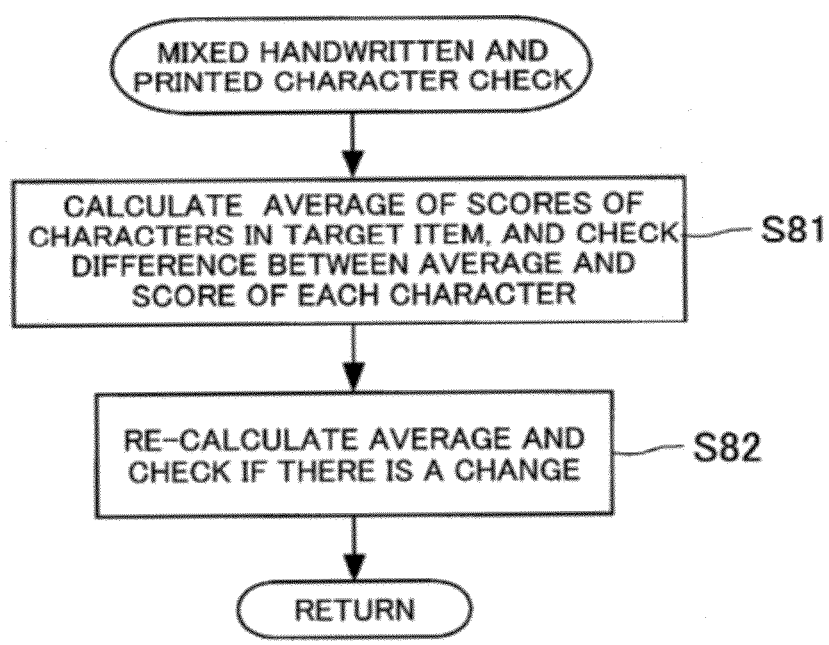
FIG. 19 is a flowchart of a mixed handwritten and printed character check process.

FIG. 19 is a flowchart of a mixed handwritten and printed character check process. FIG. 20 is a diagram for explaining how to process a recognition target item including both printed and character characters.

The mixed handwritten and printed character checker 25 calculates an average value of scores of all characters included in a recognition target item to check a difference between the average value and the score of each character (step S81). The mixed handwritten and printed character checker 25 re-calculates an average value by using characters other than those exhibiting a significant difference, and checks whether the re-calculated average value is different from the previous one or not, to thereby determine whether characters are printed or handwritten (step S82).

A process for determining whether a recognition target item includes both handwritten and printed characters will be described with reference to FIG. 20. Each character in the recognition target item is analyzed, and an aggregate score is calculated. Then, an average value of the all characters is calculated from the aggregate scores of the characters (taken as a first average value) (in the illustrated example, the first average value is −0.9). Then, a difference between the first average value and the aggregate score of each character is calculated, and it is determined whether the absolute value of the difference is larger than a threshold. Assume that the threshold is 10. Every character has an absolute value of a difference between the first average character and the aggregate score of the character greater than the threshold, so that the judgments of the analysis of this stage are all NO.

Existence of characters exhibiting significant differences means that there is a possibility that these characters are of different type (handwritten or printed) from the others. Therefore, characters having smaller values than the first average value are excluded from the recognition target item, and then the average value of aggregate scores (taken as a second average value) is re-calculated only by using characters having values greater than the first average value (in the illustrated example, the second average value is 42.86).

In the case where there is a big difference between the first and second average values, the excluded characters are determined to be of different type from the others. In the illustrated figure, the excluded characters and the remaining characters are of different character types because the difference between the first and second average values is big.

Then, a difference between the second average value and the aggregate score of each of the remaining characters is calculated, and it is determined whether the absolute value of the difference is greater than the predetermined threshold. Referring to the example of FIG. 20, with respect to every character, an absolute value of a difference between the second average value and the aggregate score of the character is smaller than the determined threshold of "10", so that these characters are assumed to be of same type. Therefore, the judgments are all Yes. As a result, the characters, "平", "成", "年", "月", and "日" are determined to be printed characters while the excluded characters, "2", "1", "1", "1", "3", and "0" are determined to be handwritten characters.

In addition, if there are no characters having a significant difference from the calculated first average value, the discrimination based on the aggregate scores calculated earlier is used.

The above-described discrimination process based on the above analyses does not use form definition. However, execution of a process using form definition enhances accuracy of the handwritten-printed character discrimination process. In addition, if any of the gradation distribution analyzer 19, character color analyzer 20, character stroke gradation ratio analyzer 21, character stroke edge contrast analyzer 22, character size and center position analyzer 23, and character size and pitch analyzer 24 determines that a possibility of printing exceeds a predetermined threshold, the remaining analyses on the image character in question may be skipped and the analysis of the next image character may be started.

Figure 21:
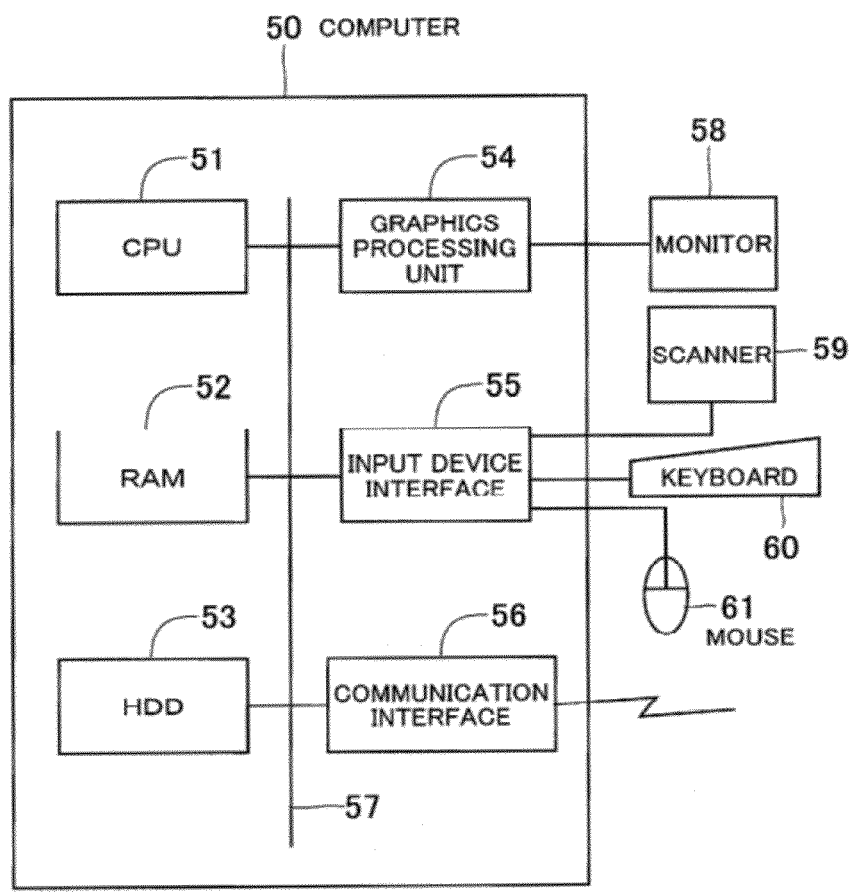
FIG. 21 illustrates an example hardware configuration of a computer to be used as a character recognition apparatus.

FIG. 21 illustrates an example hardware configuration of a computer to be used as a character recognition apparatus.

Part of the character recognition apparatus 10 is realized by a computer 50. The computer 50 is entirely controlled by a CPU (Central Processing Unit) 51. Connected to the CPU 51 via a bus 57 are a RAM (Random Access Memory) 52, a hard disk drive (HDD) 53, a graphics processing unit 54, an input device interface 55, and a communication interface 56.

The RAM 52 temporarily stores part of OS (Operating System) programs and application programs for performing a character recognition process, which are executed by the CPU 51. In addition, the RAM 52 stores various data to be used while the CPU 51 runs. The hard disk drive 53 stores the OS programs, application programs for the character recognition, dictionaries to be used in the character recognition, and others.

A monitor 58 is connected to the graphics processing unit 54. The graphics processing unit 54 displays an image on the screen of the monitor 58 under the control of the CPU 51. A scanner 59, keyboard 60, and mouse 61 are connected to the input device interface 55. The input device interface 55 transfers signals received from the scanner 59, keyboard 60, and mouse 61 to the CPU 51 via the bus 57.

The communication interface 56 is connected to a network within a financial institute. The communication interface 56 communicates data with another computer over the network.

With such a hardware configuration, the processing functions of the character recognition apparatus 10 according to the embodiment are realized. In this case, a program is prepared, which describes the processing contents of the functions of the character recognition apparatus 10. The above processing functions are realized on the computer by executing the program.

The disclosed character recognition method, character recognition apparatus, and character recognition program are designed to carry out a plurality of analyses to discriminate whether each character of a character recognition item is handwritten or printed, thereby increasing accuracy of the discrimination. As a result, it becomes possible to recognize each character as a handwritten character if it is handwritten or as a printed character if it is printed, which is advantageous in enhancing accuracy of the character recognition.

Even if a single recognition target item includes both handwritten and printed characters, each character is checked to determine whether it is handwritten or printed. As a result, it becomes possible to recognize each character as a handwritten character if it is handwritten or as a printed character if it is printed, which results in increasing accuracy of the character recognition.

When a character recognition apparatus that does not use form definition extracts a headline from a form, the character recognition apparatus uses the functions of a handwritten-printed character discrimination unit to exclude handwritten characters from headline candidates, which leads to providing improved processing performance for extracting the headline.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A character recognition method executed by a computer, the character recognition method comprising:
   specifying a character recognition target item from image data of the form;
   calculating a position and size of an image character in the specified character recognition target item;
   calculating a score that quantifies a possibility of handwriting or printing by analyzing the image character on the basis of characteristics of handwritten and printed characters;
   discriminating on the basis of the score whether the image character is handwritten or printed;
   calculating an average value of scores of characters of the recognition target item, and checking whether or not the recognition target item includes both handwritten and printed characters; and
   performing character recognition on each character of the recognition target item with an appropriate character recognition engine for a result of discriminating whether said each character is handwritten or printed and a result of checking whether the recognition target item includes both handwritten and printed characters, wherein:
   the calculating of the score includes:
      calculating a first score that quantifies a possibility of handwriting or printing by analyzing a gradation distribution of the image character;
      calculating a second score that quantifies a possibility of handwriting or printing by analyzing a character color of the image character;
      calculating a third score that quantifies a possibility of handwriting or printing by analyzing a gradation ratio between a turning point where a character stroke extracted from the image character changes and the character stroke other than the turning point;
      calculating a fourth score that quantifies a possibility of handwriting or printing by analyzing contrast at an edge of the character stroke, the contrast indicating a degree of change in gray level at a boundary between the character stroke and background;
      calculating a fifth score that quantifies a possibility of handwriting or printing by analyzing vertical sizes and center positions of the characters on the basis of a position and size of the image character; and
      calculating a sixth score that quantifies a possibility of handwriting or printing by analyzing character sizes and pitch on the basis of the position and size of the image character; and
   in discriminating whether the image character is handwritten or printed, the first to sixth scores are aggregated by weighting the first to sixth scores according to respective importance.

2. The character recognition method according to claim 1, wherein, in a case where one of the first to sixth scores, which are respectively obtained in analyzing the gradation distribution, analyzing the character color, analyzing the character stroke, analyzing the contrast at the edge of the character stroke, analyzing the vertical sizes and center positions of the characters, and analyzing the character sizes and pitch, exceeds a predetermined threshold set for determining with certainty that a character is a printed character, remaining analyses of the image character are skipped, and analyses of a next image character are started.

3. The character recognition method according to claim 1, wherein the analysis of the gradation distribution includes generating a gray image of the image character, generating a histogram of gradation values on a single-character basis, calculating a half width of the histogram, and calculating a difference between the half width and a predetermined threshold to thereby obtain the first score.

4. The character recognition method according to claim 1, wherein the analysis of the character color includes converting the image character into color space including hue, saturation, and value components, generating a saturation histogram and a value histogram, and determining based on distributions of the saturation and value whether the image character is achromatic or chromatic, and setting a value according to whether the image character is achromatic or chromatic, as the second score.

5. The character recognition method according to claim 4, wherein when a specific character color is determined from chromatic colors, the analysis of the character color includes generating a Hue histogram, and setting a value according to a distribution of the hue as the second score.

6. The character recognition method according to claim 1, wherein the analysis of the character stroke includes obtaining vectors of the character stroke extracted from the image character, calculating a turning point where the vectors cross, calculating an average gradation value of the turning point and an average gradation value of the entire character stroke other than the turning point, and setting, as the third score, a value according to a ratio between the average gradation value of the turning point and the average gradation value of the entire character stroke other than the turning point.

7. The character recognition method according to claim 1, wherein the analysis of the contrast at the edge of the character stroke includes extracting the character stroke from the image character, calculating a first gradation value that is an average of gradation values at the edge of the character stroke, calculating a second gradation value that is an average of gradation values of the entire character stroke, and setting, as the fourth score, a difference between the first gradation value and the second gradation value and a predetermined threshold.

8. The character recognition method according to claim 1, wherein the analysis of the contrast at the edge of the character stroke includes extracting the character stroke and background from the image character, calculating a first gradation value that is an average of gradation values at the edge of the character stroke, calculating a second gradation value that is an average of gradation values of the background around the edge, and setting, as the fourth score, a difference between the first gradation value, and the second gradation value and a predetermined threshold.

9. The character recognition method according to claim 1, wherein the analysis of the vertical sizes and center positions of the characters includes calculating a character string center position of a character string that is a group of characters of same vertical size, and setting, as the fifth score, a difference between a center position of the character and the character string center position and a predetermined threshold.

10. The character recognition method according to claim 1, wherein the analysis of the character sizes and pitch includes calculating a vertical size difference between a discrimination target character of the recognition target item and each of characters existing on both sides of the discrimination target character, and a pitch therebetween, and setting, as the sixth score, a value according to whether the vertical size difference and the pitch satisfy predetermined conditions.

11. A character recognition apparatus comprising:
one or more processors configured to perform a procedure comprising:
calculating a first score that quantifies a possibility of handwriting or printing by analyzing a gradation distribution of an image character in a recognition target item specified from image data of the form;
calculating a second score that quantifies a possibility of handwriting or printing by analyzing a character color of the image character;
calculating a third score that quantifies a possibility of handwriting or printing by analyzing a gradation ratio between a turning point where a character stroke extracted from the image character changes and the character stroke other than the turning point;
calculating fourth score that quantifies a possibility of handwriting or printing by analyzing contrast at an edge of the character stroke, the contrast indicating a degree of change in gray level at a boundary between the character stroke and background;
calculating a fifth score that quantifies a possibility of handwriting or printing by analyzing vertical sizes and center positions of characters on the basis of a position and size of the image character;
calculating a sixth score that quantifies a possibility of handwriting or printing by analyzing character sizes and pitch on the basis of the position and size of the image character;
calculating an average value of the first to sixth scores of the characters of the recognition target item, and checking whether or not the recognition target item includes both handwritten and printed characters;
discriminating whether the image character is handwritten or printed, on the basis of an aggregate score obtained by aggregating the first to sixth scores by weighting the first to sixth scores according to respective importance, and a result of checking whether the recognition target item includes both handwritten and printed characters; and
performing character recognition on each character of the recognition target item with an appropriate character recognition engine for a result of discriminating whether said each character is handwritten or printed.

12. A computer-readable, non-transitory medium encoded with a computer program, the computer program causing a computer to perform a procedure comprising:
specifying a character recognition target item from image data of the form;
calculating a position and size of an image character in the specified character recognition target item;
calculating a first score that quantifies a possibility of handwriting or printing by analyzing a gradation distribution of the image character;
calculating a second score that quantifies a possibility of handwriting or printing by analyzing a character color of the image character;
calculating a third score that quantifies a possibility of handwriting or printing by analyzing a gradation ratio between a turning point where a character stroke extracted from the image character changes and the character stroke other than the turning point;
calculating a fourth score that quantifies a possibility of handwriting or printing by analyzing contrast at an edge of the character stroke, the contrast indicating a degree of change in gray level at a boundary between the character stroke and background;
calculating a fifth score that quantifies a possibility of handwriting or printing by analyzing vertical sizes and center positions of characters on the basis of a position and size of the image character;
calculating a sixth score that quantifies a possibility of handwriting or printing by analyzing character sizes and pitch on the basis of the position and size of the image character;
discriminating whether the image character is handwritten or printed by aggregating the first to sixth scores by weighting the first to sixth scores according to respective importance;
calculating an average value of scores of characters of the recognition target item, and checking whether or not the recognition target item includes both handwritten and printed characters; and
performing character recognition on each character of the recognition target item according to a result of discriminating whether said each character is handwritten or printed and a result of checking whether or not the recognition target item includes both handwritten and printed characters.

* * * * *